US011211982B1

(12) United States Patent
Horn et al.

(10) Patent No.: US 11,211,982 B1
(45) Date of Patent: Dec. 28, 2021

(54) COMMUNICATION VIA A BUTLER MATRIX AND A LENS

(71) Applicant: QUALCOMM Incorporated, San Diego, CA (US)

(72) Inventors: Idan Michael Horn, Hod Hasharon (IL); Yehonatan Dallal, Kfar Saba (IL)

(73) Assignee: QUALCOMM incorporated, San Diego, CA (US)

( * ) Notice: Subject to any disclaimer, the term of this patent is extended or adjusted under 35 U.S.C. 154(b) by 0 days.

(21) Appl. No.: 16/948,639

(22) Filed: Sep. 25, 2020

(51) Int. Cl.
*H04B 7/06* (2006.01)
*H01Q 3/40* (2006.01)
*H01Q 15/02* (2006.01)

(52) U.S. Cl.
CPC .............. *H04B 7/0617* (2013.01); *H01Q 3/40* (2013.01); *H01Q 15/02* (2013.01); *H04B 7/0639* (2013.01); *H04B 7/0663* (2013.01)

(58) Field of Classification Search
CPC .. H04B 7/0617; H04B 7/0639; H04B 7/0663; H01Q 3/40; H01Q 15/02
See application file for complete search history.

(56) References Cited

U.S. PATENT DOCUMENTS

| 6,337,659 | B1 * | 1/2002 | Kim | .......................... H01Q 3/30 |
| | | | | 342/373 |
| 2002/0171585 | A1 * | 11/2002 | Eiges | ..................... H01Q 21/06 |
| | | | | 342/373 |
| 2008/0278394 | A1 * | 11/2008 | Koh | ....................... H01Q 21/08 |
| | | | | 343/754 |
| 2014/0029461 | A1 * | 1/2014 | Kinamon | ............. H01Q 25/008 |
| | | | | 370/252 |
| 2016/0301466 | A1 * | 10/2016 | Kinamon | ............. H04B 7/2628 |
| 2017/0062948 | A1 * | 3/2017 | Artemenko | .......... H04B 7/0617 |
| 2018/0269576 | A1 * | 9/2018 | Scarborough | .......... H01Q 1/288 |
| 2019/0020391 | A1 * | 1/2019 | Coutts | ..................... H01Q 3/40 |
| 2019/0229790 | A1 * | 7/2019 | Kosaka | ................... H01Q 21/06 |

OTHER PUBLICATIONS

A. Rahimian and A. Rahimian, "Enhanced RF steerable beamforming networks based on butler matrix and rotman lens for ITS applications," 2010 IEEE Region 8 International Conference on Computational Technologies in Electrical and Electronics Engineering (SIBIRCON), 2010, pp. 567-572. (Year: 2010).*

\* cited by examiner

*Primary Examiner* — Jaison Joseph
(74) *Attorney, Agent, or Firm* — Harrity & Harrity LLP/Qualcomm Incorporated

(57) ABSTRACT

Various aspects of the present disclosure generally relate to wireless communication. In some aspects, a first wireless communication device may select a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal. The first wireless communication device may communicate, with the second wireless communication device, the signal via a beam of the butler matrix and the lens. Numerous other aspects are provided.

30 Claims, 8 Drawing Sheets

COMMUNICATION VIA A BUTLER MATRIX AND A LENS

FIELD OF THE DISCLOSURE

Aspects of the present disclosure generally relate to wireless communication and to techniques and apparatuses for communication via a butler matrix and a lens.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes selecting a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal; and communicating, with the second wireless communication device, the signal via a beam of the butler matrix and the lens.

In some aspects, a first wireless communication device for wireless communication includes a memory; a set of candidate butler matrixes; a set of candidate lenses; and one or more processors operatively coupled to the memory, the memory and the one or more processors configured to: select a lens, of the set of candidate lenses, and a butler matrix, of the set of candidate butler matrixes, to communicate a signal with a second wireless communication device, wherein the lens is spaced, from the butler matrix, at a distance that is at least a far field length of the lens for a frequency associated with the signal; and communicate, with the second wireless communication device, the signal via a beam of the butler matrix and the lens.

In some aspects, a non-transitory computer-readable medium storing a set of instructions for wireless communication includes one or more instructions that, when executed by one or more processors of a first wireless communication device, cause the first wireless communication device to: select a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal; and communicate, with the second wireless communication device, the signal via a beam of the butler matrix and the lens.

In some aspects, an apparatus for wireless communication includes means for selecting a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal; and means for communicating, with the second wireless communication device, the signal via a beam of the butler matrix and the lens.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
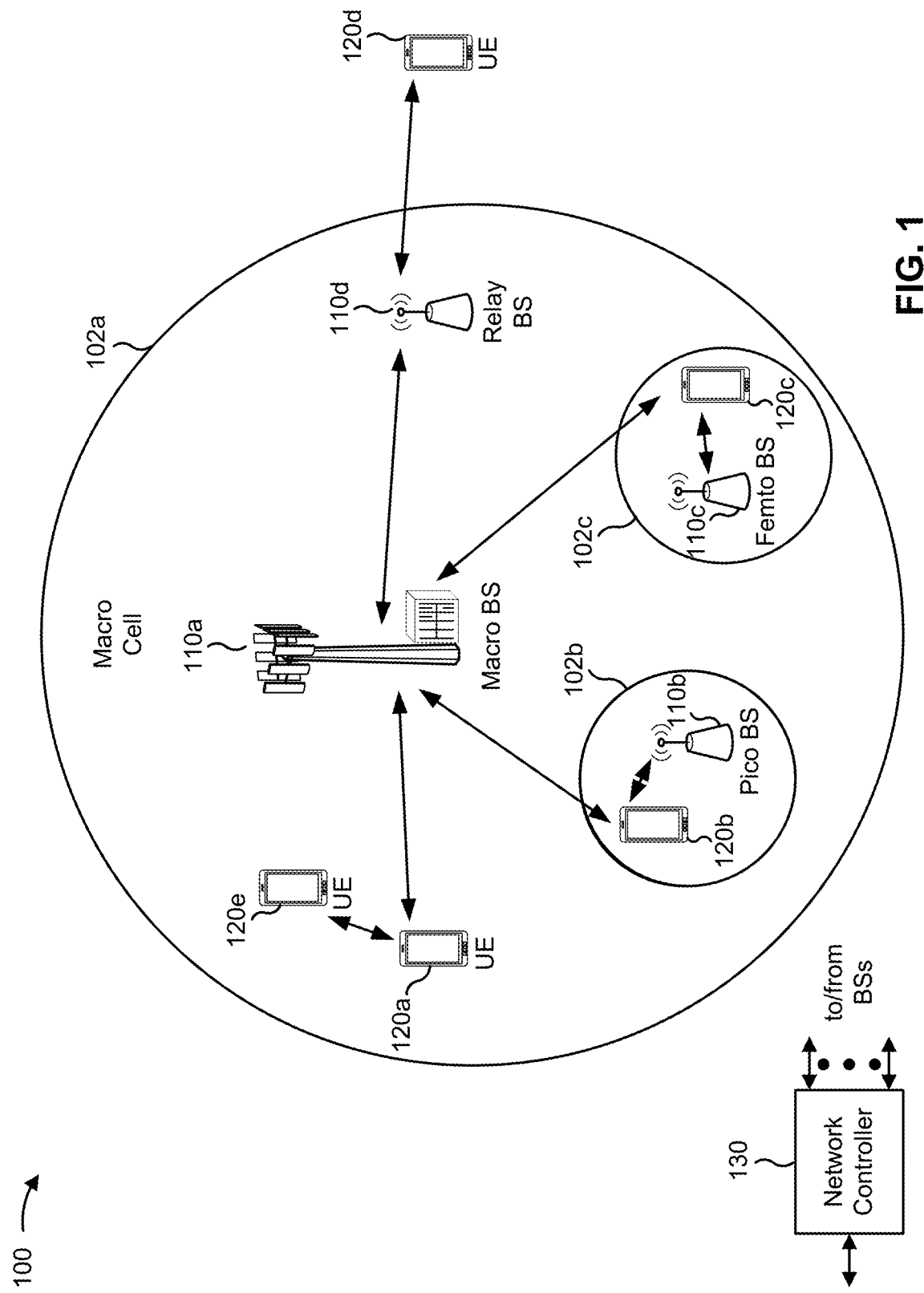
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
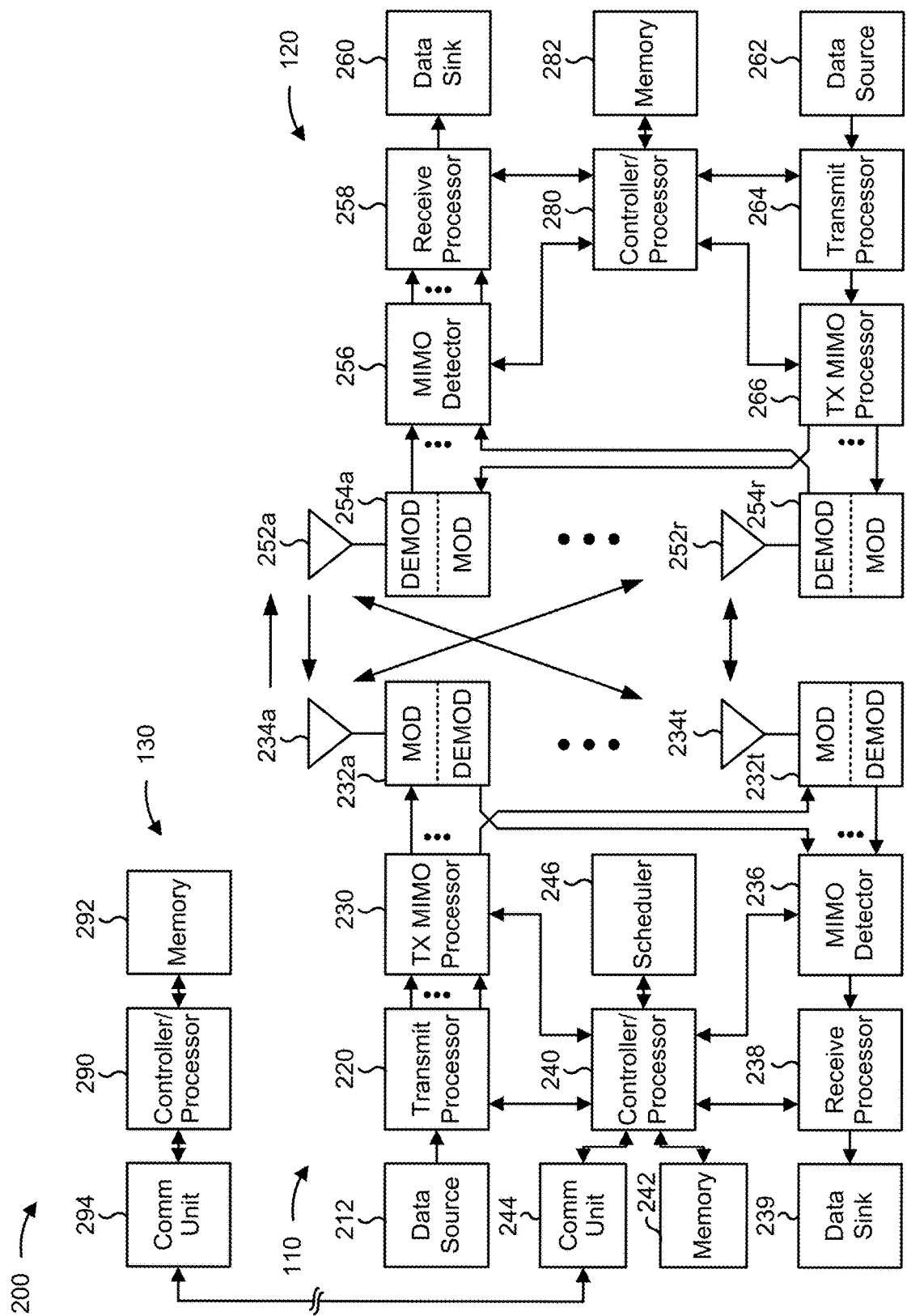
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with communication via a butler matrix and a lens, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, interpreting the instructions, and/or the like.

In some aspects, a wireless communication device (e.g., base station 110) may include means for selecting a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal (e.g., using controller/processor 240, memory 242, and/or the like); means for communicating, with the second wireless communication device, the signal via a beam of the butler matrix and the lens (e.g., using controller/processor 240, transmit processor 220, TX MIMO processor 230, MOD/DEMOD 232, antenna 234, memory 242, MIMO detector 236, receive processor 238, and/or the like); and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
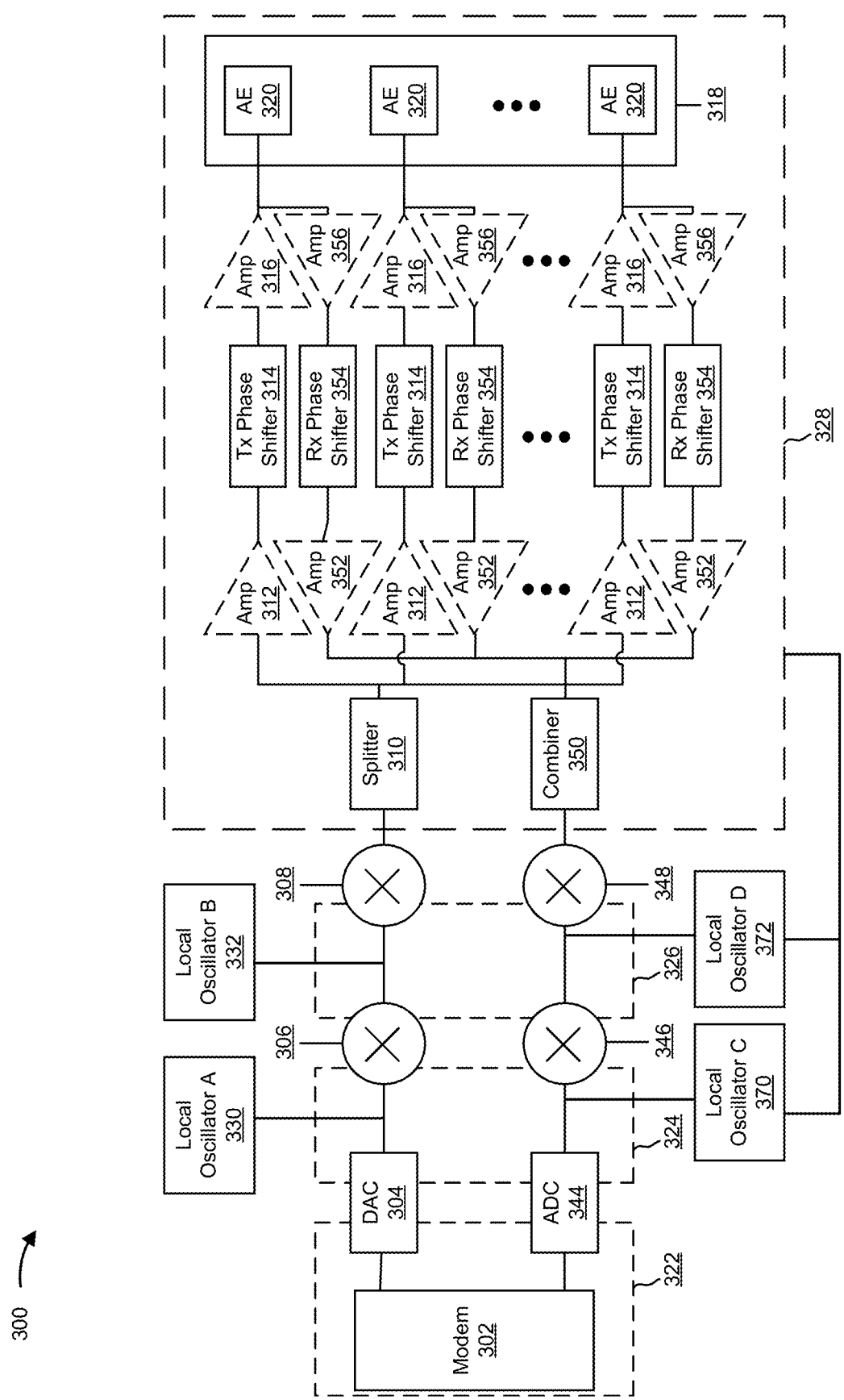
FIG. 3 is a diagram illustrating an example beamforming architecture that supports beamforming for millimeter wave communications, in accordance with various aspects of the present disclosure.

FIG. 3 is a diagram illustrating an example beamforming architecture 300 that supports beamforming for millimeter wave (mmW) communications, in accordance with various aspects of the present disclosure. In some aspects, architecture 300 may implement aspects of wireless network 100. In some aspects, architecture 300 may be implemented in a transmitter device (e.g., a first wireless communication device, UE, or base station) and/or a receiver device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330 and a local oscillator B 332.

Each of the antenna elements 320 (also referred to herein as "radiating elements") may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 314 are present. In some aspects, neither the first amplifier 312 nor the second amplifier 314 is present. In some aspects, one of the two amplifiers 312, 314 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302) to provide independent control of the gain for each antenna element 320. For example, the modem 302 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other.

As indicated above, FIG. 3 is provided as an example. Other examples may differ from what is described with regard to FIG. 3.

Beam forming using phased arrays, as described relative to the transmitter device of FIG. 3, can be helpful to focus signals emitted from the transmitter device so that the signals can reach a receiver device. For example, focusing the beam may provide an increased power density for a transmission, which may extend a range of the transmission. However, to steer beams, the transmitter device may require a significant number of radiating elements to provide flexibility to modify an angle of a steered beam. For example, array directivity (e.g., an amount by which an angle can be modified) may be proportional to a number of radiating elements. In some aspects, a beam divergence (e.g., amount by which an angle can be modified) may be proportional to a quotient of a wavelength of a transmitted signal and a diameter of an aperture of the radiating elements. In an example, for a signal having a frequency of 100 gigahertz (GHz), a beam divergence of 6 degrees may require an aperture of about 3 centimeters. With an inter-element separation of ½ of a wavelength of the signal, the transmitter device may have 400 radiating elements in an array. Using 400 radiating elements may consume an unnecessarily high amount of power resources of the transmitter device, may require associated circuitry to control emissions using the 400 radiating elements, may consume space within the transmitter device, and/or the like.

In some aspects described herein, a first wireless communication device (e.g., base station 110, UE 120, and/or the like) may use a set of candidate butler matrixes and a set of candidate lenses to provide high directivity capabilities to the first wireless communication device. In some aspects, the first wireless communication device may select a lens the set of candidate lenses to provide coarse steering for a beam. The first wireless communication device may select a butler matrix of the set of candidate butler matrixes to provide fine steering for the beam. In some aspects, the lens may be associated with the candidate butler matrixes based at least in part on the candidate butler matrixes being configured to generate a beam (e.g., having an input/output) in a direction of the lens. In some aspects, the candidate butler matrixes may be configured to generate beams in directions of lenses of the set of lenses.

Based at least in part on using a set of candidate butler matrixes and a set of candidate lenses, the wireless communication device may be configured for high directivity with a relatively low number of radiating elements when compared to a system without the set of candidate lenses and the set of candidate butler matrixes. Based at least in part on using the system described herein, the wireless communication device may conserve power resources, may require fewer radiating elements and/or less associated circuitry, may conserve space within the wireless communication device, and/or the like.

Figure 4:
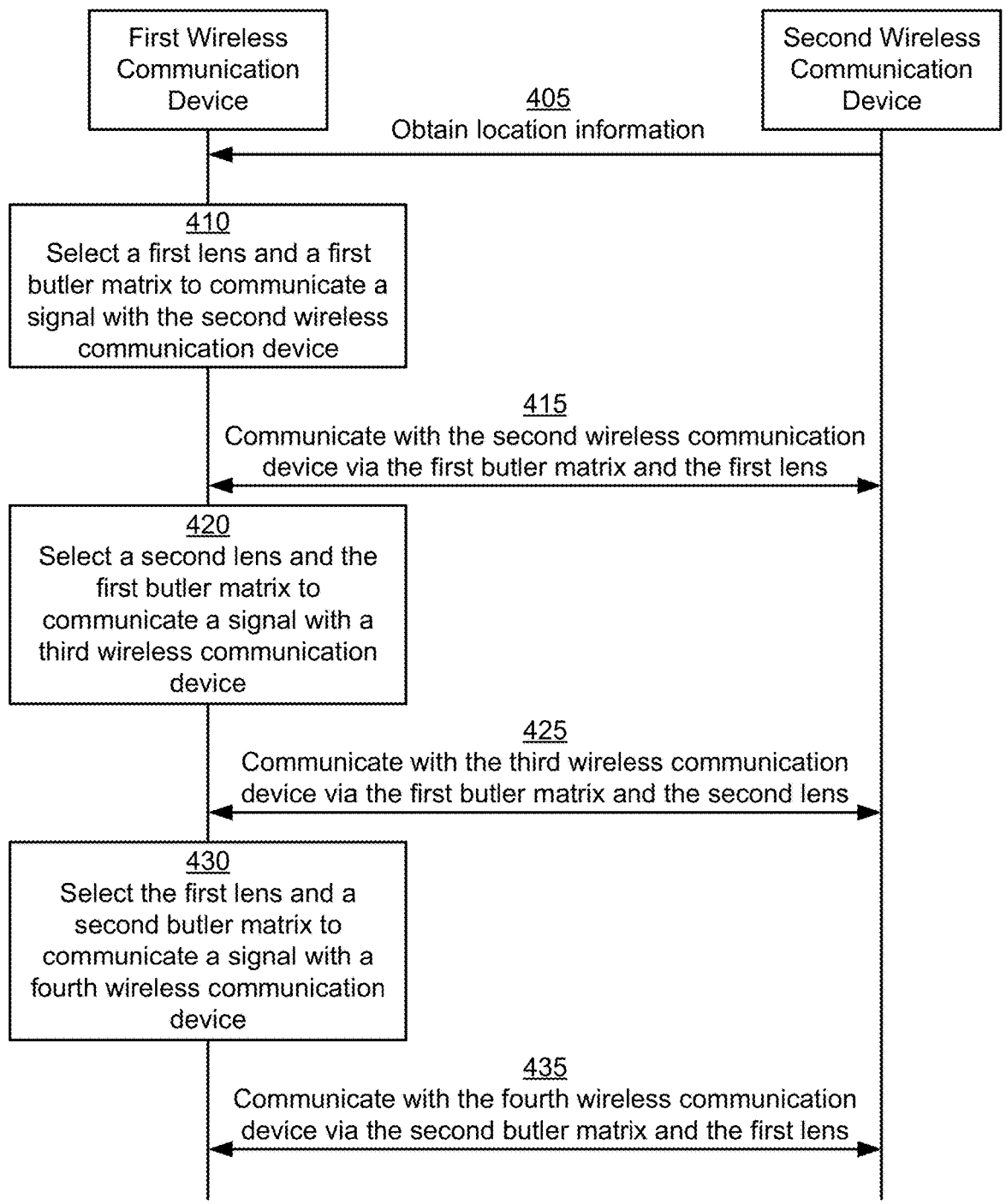
FIGS. 4-6 are diagrams illustrating examples associated with communication via a butler matrix and a lens, in accordance with various aspects of the present disclosure.

FIG. 4 is a diagram illustrating an example 400 associated with communication via a butler matrix and a lens, in accordance with various aspects of the present disclosure. As shown in FIG. 4, a first wireless communication device (e.g., base station 110, UE 120, and/or the like) may communicate with a second wireless communication device (e.g., base station 110, UE 120, and/or the like). The first wireless communication device and the second wireless communication device may be part of a wireless network (e.g., wireless network 100).

As shown in FIG. 4, and by reference number 405, the first wireless communication device may obtain location information associated with the second wireless communication device. In some aspects, the first wireless communication device may obtain the location information explicitly from the second wireless communication device (e.g., via control signaling), via a beam sweeping process, via a channel state feedback report, via a channel state information report, and/or the like. The location information may include a geolocation of the second wireless communication device, a geolocation of the second wireless communication device, a location of the second wireless communication device relative to the first wireless communication device, one or more beam directions for communications between the first wireless communication device and the second wireless communication device, and/or the like.

As shown by reference number 410, the first wireless communication device may select a first lens and a first butler matrix to communicate a signal with the second wireless communication device. In some aspects, the first wireless communication device may select the first lens from a set of candidate lenses and/or may select the first butler matrix from a set of candidate butler matrixes. In some aspects, the first wireless communication device may select the first lens and/or the first butler matrix based at least in part on the location information. In some aspects, the first lens and/or one or more of the candidate lenses are spaced from the first butler matrix and/or one or more of the candidate butler matrixes at a distance that is at least a far field length of the lens for a frequency of the signal.

The first wireless communication device may select the first lens based at least in part on the first lens being associated with a rough direction for communication of the signal. The first wireless communication device may select the first butler matrix based at least in part on the first butler matrix being associated with a fine direction for communication of the signal. In other words, the first lens may be associated with a relatively large angle of locations that includes a location of the second wireless communication device and a beam of the first butler matrix may be associate with a relatively narrow angle, within the relatively large angle, of locations.

In some aspects, a first beam of the first butler matrix is associated with the lens and a second beam of the first butler matrix is associated with a second lens of the set of candidate lenses.

In some aspects, the first butler matrix has a beam associated with the first lens (e.g., the first butler matrix is configured to generate a beam in a direction of the first lens) and a second butler matrix, of the set of candidate butler matrixes, has a beam associated with the first lens (e.g., the second butler matrix is configured to generate a beam in a direction of the first lens). The beam of the first butler matrix may be positioned at a first angle from an optical axis of the first lens and the beam of the second butler matrix may be positioned at a second angle from the optical axis of the lens. In some aspects, the first wireless communication device may select the first butler matrix based at least in part on the first angle from the optical axis of the lens being associated with the location information.

In some aspects, a number of candidate lenses of the set of candidate lenses is equal to, or less than, a number of beams of the first butler matrix (e.g., a number of beams that the first butler matrix is configured to generate). In some aspects, a diameter of the first lens and/or one or more lenses of the set of candidate lenses is greater than a size of an antenna array of the first butler matrix and/or one or more butler matrixes of the set of candidate butler matrixes.

In some aspects, the set of candidate lenses may be arranged to be non-planar. For example, the set of candidate lenses may be arranged in a generally arched shape. In some aspects, the set of candidate lenses may be arranged in a 3-dimensional array. For example, the set of candidate lenses may be arranged with a generally hemispherical shape, generally ellipsoidal shape, pyramidic shape, trapezoidal-prism shape, or a parallelepiped shape, among other examples. In some aspects, the 3-dimensional array may be configured with localized lenses with unique optical axes. For example, the set of candidate lenses 510 may be arranged as a 2-dimensional rectangular array.

The set of candidate butler matrixes 504 may be arranged in a 2-dimentional array or a 3-dimensional array. For example, the set of candidate butler matrixes 504 may be arranged with a circular shape, rectangular shape, or triangular shape, among other examples. In some aspects, the set of candidate butler matrixes 504 may be arranged as a unified rectangular array.

As shown by reference number 415, the first wireless communication device may communicate with the second wireless communication device via the first butler matrix and the first lens. In some aspects, the first wireless communication device may receive, from the second wireless communication device, the signal via the first lens and a beam of the first butler matrix. In some aspects, the first wireless communication device may receive the signal from the second wireless communication device by sampling the signal on an input of the first butler matrix that is associated with an output that is associated with the beam of the first butler matrix.

In some aspects, the first wireless communication device may transmit, to the second wireless communication device, the signal via the beam of the first butler matrix and the first lens. In some aspects, the first wireless communication device may transmit the signal to the second wireless communication device by providing the signal to the first butler matrix using an input that is associated with an output that is associated with the beam of the first butler matrix.

As shown by reference number 420, the first wireless communication device may select a second lens and the first butler matrix to communicate a signal with a third wireless communication device. As shown by reference number 425, the first wireless communication device may communicate with the third wireless communication device via the first butler matrix and the second lens. In other words, the first wireless communication device may communicate with a third wireless communication device using the first butler matrix and a second lens.

As shown by reference number 430, the first wireless communication device may select the first lens and a second butler matrix to communicate a signal with a fourth wireless communication device. As shown by reference number 435, the first wireless communication device may communicate with the fourth wireless communication device via the second butler matrix and the first lens. In other words, the first wireless communication device may communicate with a fourth wireless communication device using the second butler matrix and the first lens.

Based at least in part on using a set of candidate butler matrixes and a set of candidate lenses, the wireless communication device may be configured for high directivity with a relatively low number of radiating elements when compared to a system without the set of candidate lenses and the set of candidate butler matrixes. Based at least in part on using the system described herein, the wireless communication device may conserve power resources, may require fewer radiating elements and/or less associated circuitry, may conserve space within the wireless communication device, and/or the like.

As indicated above, FIG. 4 is provided as an example. Other examples may differ from what is described with regard to FIG. 4.

Figure 5:
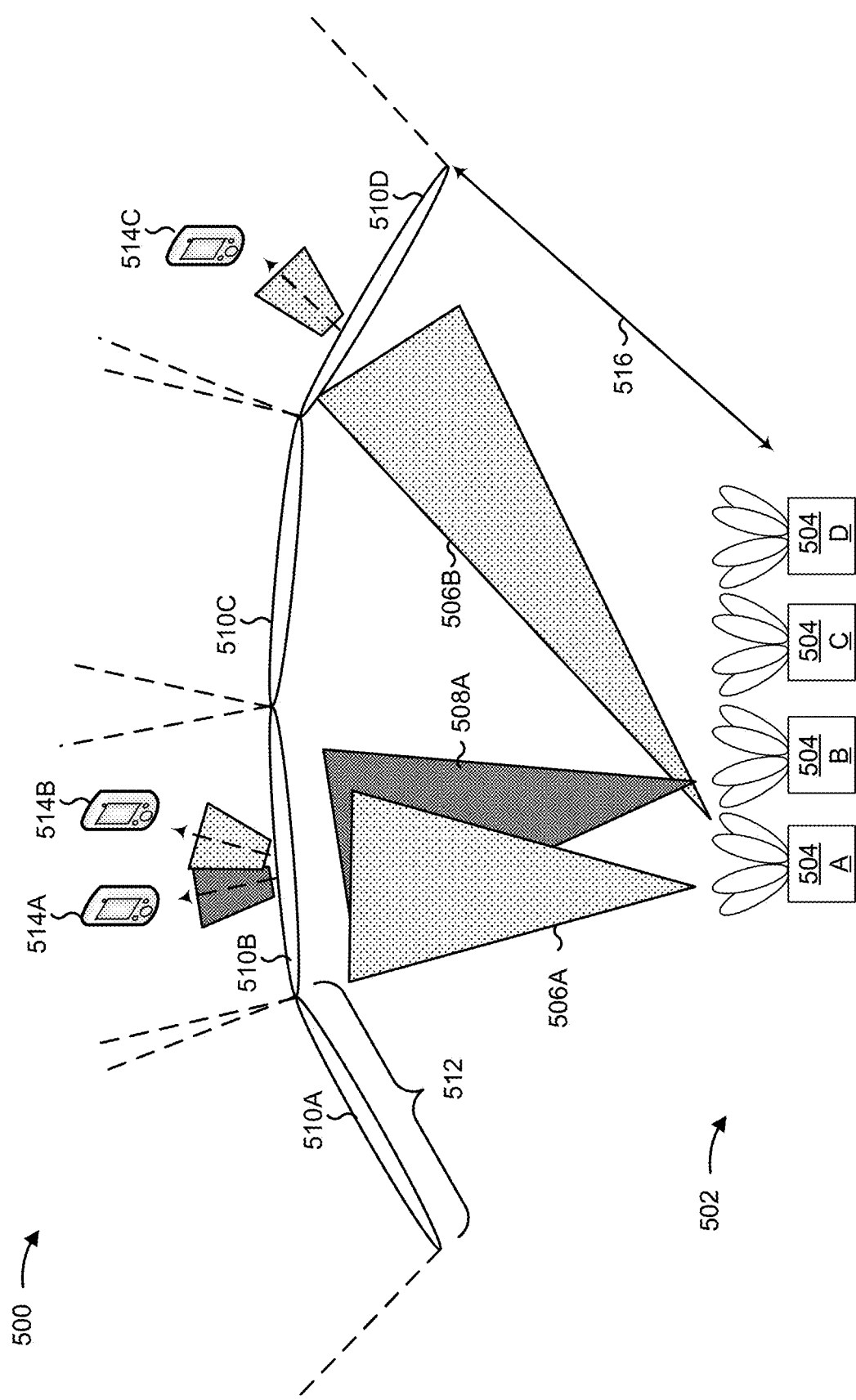

FIG. 5 is a diagram illustrating an example 500 associated with communication via a butler matrix and a lens, in accordance with various aspects of the present disclosure. As shown in FIG. 5, a first wireless communication device 502 (e.g., base station 110, UE 120, and/or the like) may communicate with one or more second wireless communication devices 514A, 514B, 514C (collectively or individually, "second wireless communication device(s) 514"). The first wireless communication device 502 and the second wireless communication devices (e.g., base stations 110, UEs 120, and/or the like) may be part of a wireless network (e.g., wireless network 100).

As shown in FIG. 5, the first wireless communication device 502 may include candidate butler matrixes 504A, 504B, 504C, 504D (collectively, a "set of candidate butler matrixes 504"). The set of candidate butler matrixes 504 may be configured to generate multiple beams (e.g., multiple beams per butler matrix of the set of candidate butler matrixes 504). For example, the candidate butler matrix 504A may generate a first beam 506A using a first output and a second beam 506B using a second output. In some aspects, the candidate butler matrix 504A may generate additional beams. Candidate butler matrix 504B may generate a first beam 508A and/or one or more additional beams. In some aspects, the set of candidate butler matrixes may be calibrated to optimize beam separation and/or to optimize capacities of one or more associated lenses.

In some aspects, beams of candidate butler matrixes of the set of candidate butler matrixes 504 may be associated with different lenses of one or more candidate lenses 510A, 510B, 510C, 510D (collectively a "set of candidate lenses 510"). In some aspects, a number of lenses may be equal to or smaller than a number of outputs (e.g., a size) of one or more of the candidate butler matrixes of the set of candidate butler matrixes 504. As shown in FIG. 5, the first beam 506A of the butler matrix 504A may be associated with the candidate lens 510B and the second beam 506B may be associated with the candidate lens 510 D. Also shown in FIG. 5, the first beam 508A of the butler matrix 504B may be associated with the candidate lens 510B. In other words, two or more butler matrixes may be used to communicate via a single candidate lens and/or a single butler matrix may be used to communicate via multiple lenses.

As shown by reference number 512, the candidate lens 510A and/or one or more additional candidate lenses may have a diameter D. In some aspects, the diameter D may be configured based at least in part on angles and/or widths of lobes of beams generated by the set of candidate butler matrixes 504. In other words, the diameter D may be optimized to maximize energy captured from beams of the set of candidate butler matrixes 504 (e.g., to capture a maximum aperture of main lobes of the beams).

The first wireless communication device 502 may communicate with one or more of the second wireless communication devices 514 based at least in part on selecting a lens of the set of candidate lenses 510 and a butler matrix of the set of candidate butler matrixes 504 that are associated with locations of the one or more of the second wireless communication devices 514. In some aspects, the first wireless communication device 502 may perform beam tracking based at least in part on changing between butler matrixes (e.g., using beams associated with a selected candidate lens) and/or changing between candidate lenses.

In some aspects, the first wireless communication device 502 may communicate with a number of second wireless communication devices that is less than or equal to a product of a number of outputs of the candidate butler matrixes (e.g., sizes of the candidate butler matrixes) and a number of butler matrixes.

As shown by reference number 516, the set of candidate lenses 510 may be spaced from the set of candidate butler matrixes 504 at a distance that is at least a far field length of the set of candidate lenses 510 for a frequency associated with a signal. For example, if the frequency associated with the signal is 140 gigahertz, the set of candidate lenses 510 may be spaced from the set of candidate butler matrixes 504 at a distance that is greater than or equal to 16 millimeters.

As indicated above, FIG. 5 is provided as an example. Other examples may differ from what is described with regard to FIG. 5.

Figure 6:
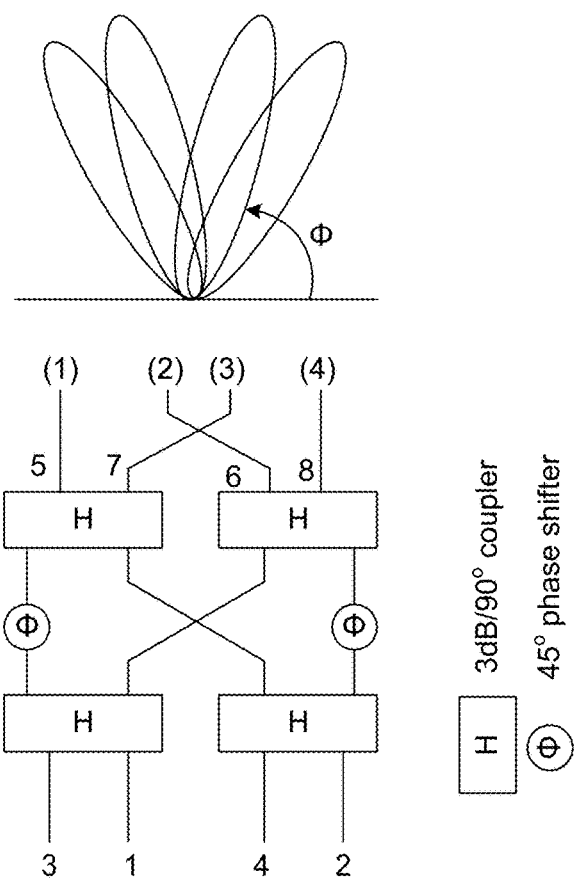

As shown in FIG. 6, example 600 includes a 4×4 butler matrix having 4 transmission paths to radiating elements. As shown, the butler matrix includes four 3 dB/90 degree couplers and two 45 degree phase shifters. Other examples of butler matrixes include a 2×2 butler matrix having 2 transmission paths, an 8×8 butler matrix having 8 transmission paths, a 16×16 butler matrix having 16 transmission paths, and/or the like. The butler matrix may apply phase shifts to instances of a signal such that the instances of the signal are orthogonal and spaced with discrete angles. The butler matrix may apply phase shifts to data streams before providing instances of data streams to one or more radiating elements to produce beams corresponding to inputs of the butler matrix.

In some aspects, the discrete angles may be associated with candidate lenses. In a far field, one or more beams emitted from the radiating elements may combine coherently to form a first combined beam and a second combined beam. The first combined beam and the second combined beam may be highly directional beams when compared to a phase array transmitter device without lenses.

As indicated above, FIG. 6 is provided as an example. Other examples may differ from what is described with regard to FIG. 6.

Figure 7:
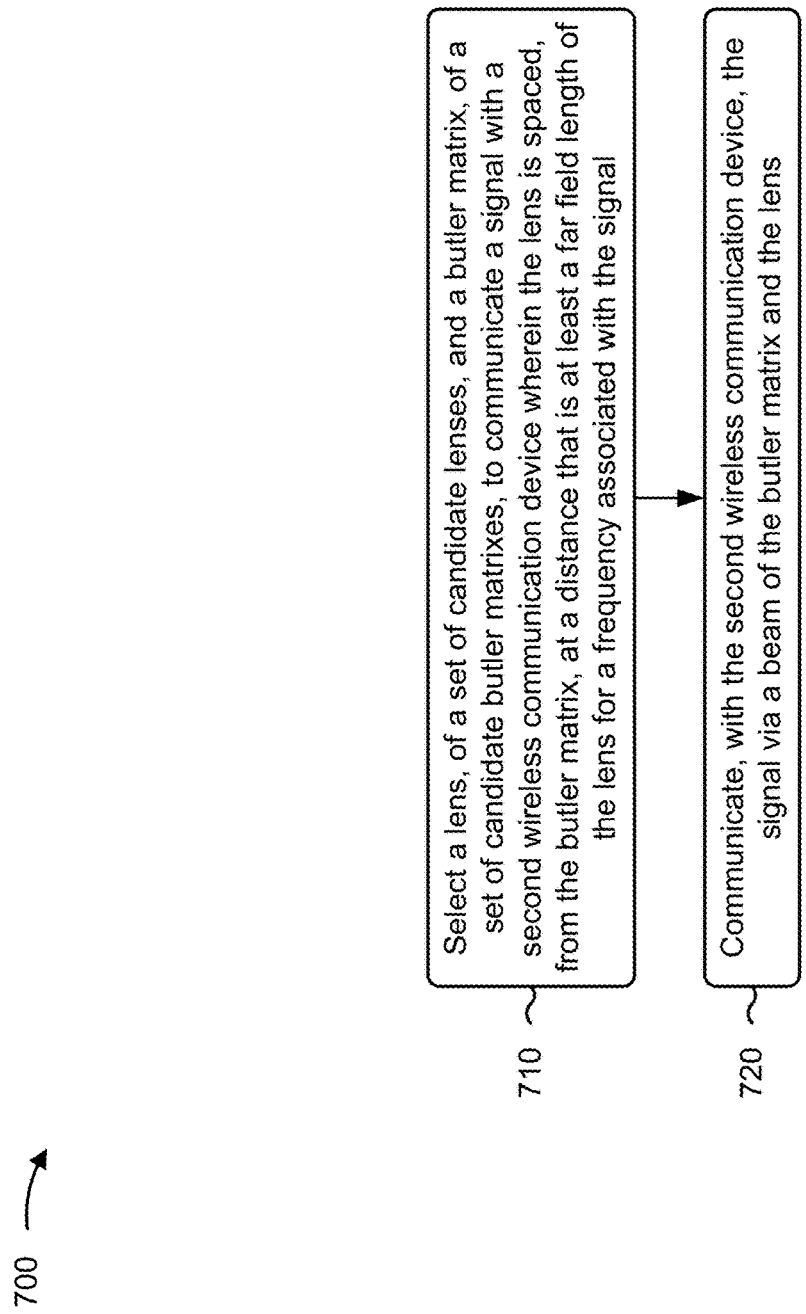
FIG. 7 is a diagram illustrating an example process associated with communication via a butler matrix and a lens, in accordance with various aspects of the present disclosure.

FIG. 7 is a diagram illustrating an example process 700 performed, for example, by a first wireless communication device, in accordance with various aspects of the present disclosure. Example process 700 is an example where the first wireless communication device (e.g., base station 110) performs operations associated with communication via a butler matrix and a lens.

As shown in FIG. 7, in some aspects, process 700 may include selecting a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal (block 710). For example, the base station (e.g., using selection component 808, depicted in FIG. 8) may select a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal, as described above, for example, with reference to FIGS. 4, 5, and/or 6. In some aspects, the lens is spaced, from the butler matrix, at a distance that is at least a far field length of the lens for a frequency associated with the signal.

As further shown in FIG. 7, in some aspects, process 700 may include communicating, with the second wireless communication device, the signal via a beam of the butler matrix and the lens (block 720). For example, the base station (e.g., using reception component 802 and/or transmission component 804, depicted in FIG. 8) may communicate, with the second wireless communication device, the signal via a beam of the butler matrix and the lens, as described above, for example, with reference to FIGS. 4, 5, and/or 6.

Process 700 may include additional aspects, such as any single aspect or any combination of aspects described below and/or in connection with one or more other processes described elsewhere herein.

In a first aspect, selecting the lens comprises selecting a rough direction for communication of the signal, and wherein selecting the butler matrix comprises selecting a fine direction for communication of the signal.

In a second aspect, alone or in combination with the first aspect, a first beam of the butler matrix is associated with the lens, and wherein a second beam of the butler matrix is associated with a candidate lens of the set of candidate lenses.

In a third aspect, alone or in combination with one or more of the first and second aspects, the butler matrix has a first beam associated with the lens, wherein a candidate butler matrix, of the set of candidate butler matrixes, has a second beam associated with the lens, wherein the first beam is positioned at a first angle from an optical axis of the lens and the second beam is positioned at a second angle from the optical axis of the lens, and wherein selection of the butler matrix is based at least in part on the first angle from the optical axis of the lens.

In a fourth aspect, alone or in combination with one or more of the first through third aspects, a number of candidate lenses of the set of candidate lenses is equal to, or less than, a number of beams of the butler matrix.

In a fifth aspect, alone or in combination with one or more of the first through fourth aspects, a diameter of the lens is greater than a size of an antenna array of the butler matrix.

In a sixth aspect, alone or in combination with one or more of the first through fifth aspects, process 700 includes selecting a candidate lens, of the set of candidate lenses, to communicate with a third communication device via an additional beam of the butler matrix and the candidate lens.

In a seventh aspect, alone or in combination with one or more of the first through sixth aspects, process 700 includes selecting a candidate butler matrix, of the set of candidate butler matrixes, to communicate with a third communication device via a beam of the candidate butler matrix and the lens.

In an eighth aspect, alone or in combination with one or more of the first through seventh aspects, one or more of the set of candidate lenses are arranged in a 3-dimensional array, or the set of candidate butler matrixes are arranged in a 3-dimensional array.

In a ninth aspect, alone or in combination with one or more of the first through eighth aspects, communicating the signal via the beam of the butler matrix and the lens comprises receiving, from the second wireless communication device, the signal via the lens and the beam of the butler matrix, or transmitting, to the second wireless communication device, the signal via the beam of the butler matrix and the lens.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
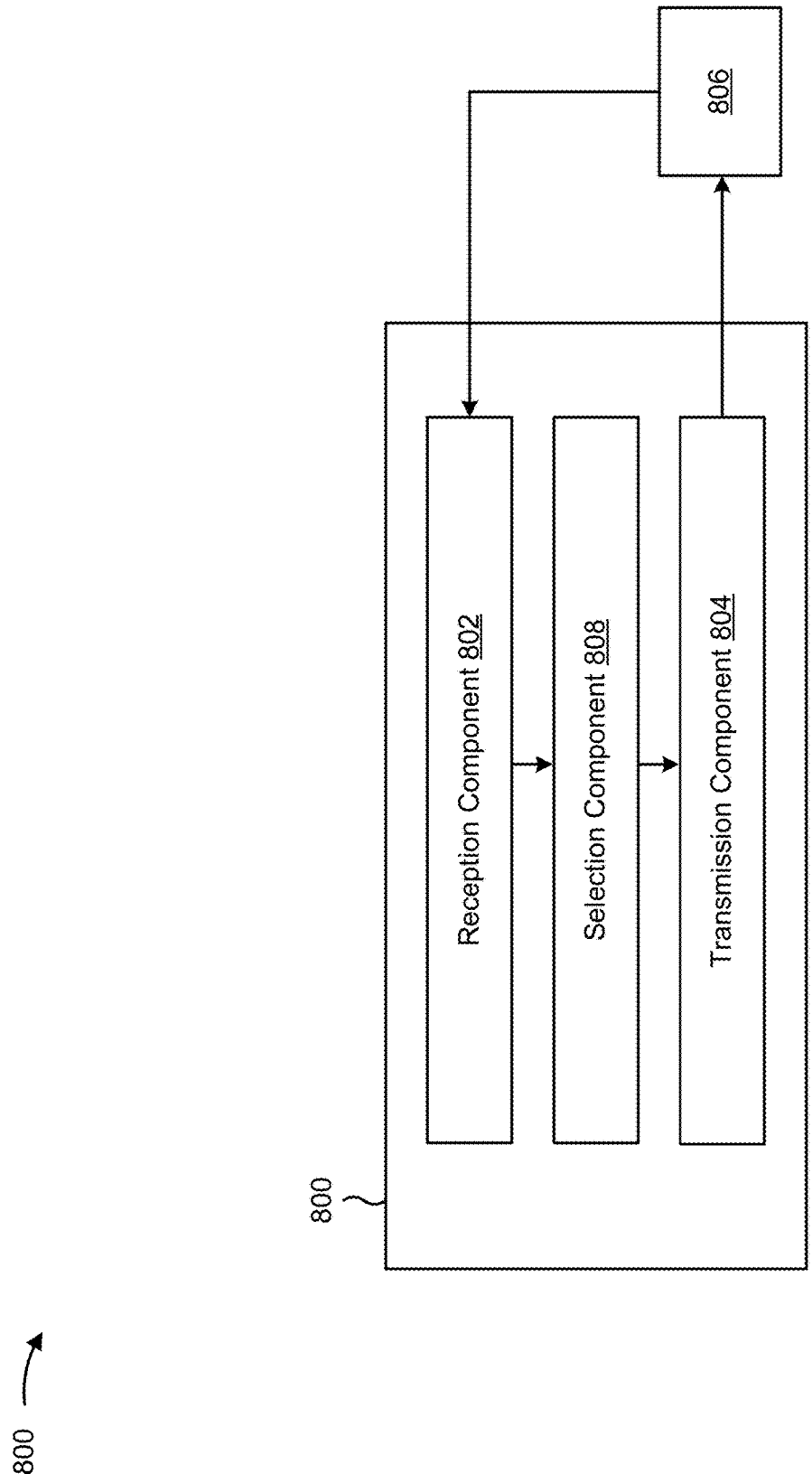
FIG. 8 is a block diagram of an example apparatus for wireless communication, in accordance with various aspects of the present disclosure.

FIG. 8 is a block diagram of an example apparatus 800 for wireless communication. The apparatus 800 may be a wireless communication device, or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a selection component 808.

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the wireless communication device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be collocated with the reception component 802 in a transceiver.

The selection component 808 may select a lens, of a set of candidate lenses, and a butler matrix, of a set of candidate butler matrixes, to communicate a signal with a second wireless communication device wherein the lens is spaced, from the butler matrix, at a distance that is at least a far field length of the lens for a frequency associated with the signal. In some aspects, the selection component 808 may include one or more antennas, a demodulator, a MIMO detector, a receive processor, a modulator, a transmit MIMO processor, a transmit processor, a controller/processor, a memory, or a combination thereof, of the wireless communication device described above in connection with FIG. 2. The reception component 802 and/or the transmission component 804 may communicate, with the second wireless communication device, the signal via a beam of the butler matrix and the lens.

The selection component 808 may select a candidate lens, of the set of candidate lenses, to communicate with a third communication device via an additional beam of the butler matrix and the candidate lens.

The selection component 808 may select a candidate butler matrix, of the set of candidate butler matrixes, to communicate with a third communication device via a beam of the candidate butler matrix and the lens.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless communication device, comprising:
   selecting a lens, of a set of candidate lenses, and a butler matrix, of a set of candidate butler matrixes, to communicate a signal with a second wireless communication device,
      wherein the lens is spaced, from the butler matrix, at a distance that is at least a far field length of the lens for a frequency associated with the signal; and
   communicating, with the second wireless communication device, the signal via a beam of the butler matrix and the lens.

2. The method of claim 1, wherein selecting the lens comprises selecting a rough direction for communication of the signal, and
   wherein selecting the butler matrix comprises selecting a fine direction for communication of the signal.

3. The method of claim 1, wherein a first beam of the butler matrix is associated with the lens, and
   wherein a second beam of the butler matrix is associated with a candidate lens of the set of candidate lenses.

4. The method of claim 1, wherein the butler matrix has a first beam associated with the lens,
   wherein a candidate butler matrix, of the set of candidate butler matrixes, has a second beam associated with the lens,
   wherein the first beam is positioned at a first angle from an optical axis of the lens and the second beam is positioned at a second angle from the optical axis of the lens, and
   wherein selection of the butler matrix is based at least in part on the first angle from the optical axis of the lens.

5. The method of claim 1, wherein a number of candidate lenses of the set of candidate lenses is equal to, or less than, a number of beams of the butler matrix.

6. The method of claim 1, wherein a diameter of the lens is greater than a size of an antenna array of the butler matrix.

7. The method of claim 1, further comprising:
   selecting a candidate lens, of the set of candidate lenses, to communicate with a third communication device via an additional beam of the butler matrix and the candidate lens.

8. The method of claim 1, further comprising:
   selecting a candidate butler matrix, of the set of candidate butler matrixes, to communicate with a third communication device via a beam of the candidate butler matrix and the lens.

9. The method of claim 1, wherein one or more of:
   the set of candidate lenses are arranged in a 3-dimensional array, or
   the set of candidate butler matrixes are arranged in a 3-dimensional array.

10. The method of claim 1, wherein communicating the signal via the beam of the butler matrix and the lens comprises:
    receiving, from the second wireless communication device, the signal via the lens and the beam of the butler matrix, or
    transmitting, to the second wireless communication device, the signal via the beam of the butler matrix and the lens.

11. A first wireless communication device for wireless communication, comprising:
    a memory;
    a set of candidate butler matrixes;
    a set of candidate lenses; and
    one or more processors operatively coupled to the memory, the memory and the one or more processors configured to:
      select a lens, of the set of candidate lenses, and a butler matrix, of the set of candidate butler matrixes, to communicate a signal with a second wireless communication device,
        wherein the lens is spaced, from the butler matrix, at a distance that is at least a far field length of the lens for a frequency associated with the signal; and
      communicate, with the second wireless communication device, the signal via a beam of the butler matrix and the lens.

12. The first wireless communication device of claim 11, wherein the one or more processors, when selecting the lens, are configured to select a rough direction for communication of the signal, and
    wherein the one or more processors, when selecting the butler matrix, are configured to select a fine direction for communication of the signal.

13. The first wireless communication device of claim 11, wherein a first beam of the butler matrix is associated with the lens, and
    wherein a second beam of the butler matrix is associated with a candidate lens of the set of candidate lenses.

14. The first wireless communication device of claim 11, wherein the butler matrix has a first beam associated with the lens,
    wherein a candidate butler matrix, of the set of candidate butler matrixes, has a second beam associated with the lens, wherein the first beam is positioned at a first angle from an optical axis of the lens and the second beam is positioned at a second angle from the optical axis of the lens, and wherein selection of the butler matrix is based at least in part on the first angle from the optical axis of the lens.

15. The first wireless communication device of claim 11, wherein a number of candidate lenses of the set of candidate lenses is equal to, or less than, a number of beams of the butler matrix.

16. The first wireless communication device of claim 11, wherein a diameter of the lens is greater than a size of an antenna array of the butler matrix.

17. The first wireless communication device of claim 11, wherein the one or more processors are further configured to:

select a candidate lens, of the set of candidate lenses, to communicate with a third communication device via an additional beam of the butler matrix and the candidate lens.

18. The first wireless communication device of claim 11, wherein the one or more processors are further configured to:

select a candidate butler matrix, of the set of candidate butler matrixes, to communicate with a third communication device via a beam of the candidate butler matrix and the lens.

19. The first wireless communication device of claim 11, wherein one or more of:

the set of candidate lenses are arranged in a 3-dimensional array, or the set of candidate butler matrixes are arranged in a 3-dimensional array.

20. The first wireless communication device of claim 11, wherein the one or more processors, when communicating the signal via the beam of the butler matrix and the lens, are configured to:

receive, from the second wireless communication device, the signal via the lens and the beam of the butler matrix, or transmit, to the second wireless communication device, the signal via the beam of the butler matrix and the lens.

21. A non-transitory computer-readable medium storing a set of instructions for wireless communication, the set of instructions comprising:

one or more instructions that, when executed by one or more processors of a first wireless communication device, cause the first wireless communication device to:

select a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal; and communicate, with the second wireless communication device, the signal via a beam of the butler matrix and the lens.

22. The non-transitory computer-readable medium of claim 21, wherein the one or more instructions, that cause the first wireless communication device to select the lens, cause the first wireless communication device to select a rough direction for communication of the signal, and wherein the one or more instructions, that cause the first wireless communication device to select the butler matrix, cause the first wireless communication device to select a fine direction for communication of the signal.

23. The non-transitory computer-readable medium of claim 21, wherein the butler matrix has a first beam associated with the lens, wherein a candidate butler matrix, of the set of candidate butler matrixes, has a second beam associated with the lens, wherein the first beam is positioned at a first angle from an optical axis of the lens and the second beam is positioned at a second angle from the optical axis of the lens, and wherein selection of the butler matrix is based at least in part on the first angle from the optical axis of the lens.

24. The non-transitory computer-readable medium of claim 21, wherein the one or more instructions further cause the first wireless communication device to:

select a candidate lens, of the set of candidate lenses, to communicate with a third communication device via an additional beam of the butler matrix and the candidate lens.

25. The non-transitory computer-readable medium of claim 21, wherein one or more of:

the set of candidate lenses are arranged in a 3-dimensional array, or the set of candidate butler matrixes are arranged in a 3-dimensional array.

26. An apparatus for wireless communication, comprising:

means for selecting a lens, of a set of candidate lenses, and a butler matrix, of a set of candidate butler matrixes, to communicate a signal with a second wireless communication device, wherein the lens is spaced, from the butler matrix, at a distance that is at least a far field length of the lens for a frequency associated with the signal; and means for communicating, with the second wireless communication device, the signal via a beam of the butler matrix and the lens.

27. The apparatus of claim 26, wherein the means for selecting the lens comprises means for selecting a rough direction for communication of the signal, and wherein the means for selecting the butler matrix comprises means for selecting a fine direction for communication of the signal.

28. The apparatus of claim 26, wherein the butler matrix has a first beam associated with the lens, wherein a candidate butler matrix, of the set of candidate butler matrixes, has a second beam associated with the lens, wherein the first beam is positioned at a first angle from an optical axis of the lens and the second beam is positioned at a second angle from the optical axis of the lens, and wherein selection of the butler matrix is based at least in part on the first angle from the optical axis of the lens.

29. The apparatus of claim 26, further comprising:

means for selecting a candidate lens, of the set of candidate lenses, to communicate with a third communication device via an additional beam of the butler matrix and the candidate lens.

30. The apparatus of claim 26, wherein one or more of:
the set of candidate lenses are arranged in a 3-dimensional array, or
the set of candidate butler matrixes are arranged in a 3-dimensional array.

* * * * *